(12) United States Patent
French, Jr.

(10) Patent No.: US 10,234,837 B2
(45) Date of Patent: Mar. 19, 2019

(54) ADAPTIVE PERFORMANCE TARGETS FOR CONTROLLING A MOBILE MACHINE

(71) Applicant: Deere & Company, Moline, IL (US)

(72) Inventor: William D. French, Jr., Bettendorf, IA (US)

(73) Assignee: Deere & Company, Moline, IL (US)

(*) Notice: Subject to any disclaimer, the term of this patent is extended or adjusted under 35 U.S.C. 154(b) by 416 days.

(21) Appl. No.: 14/868,132

(22) Filed: Sep. 28, 2015

(65) Prior Publication Data

US 2017/0090445 A1    Mar. 30, 2017

(51) Int. Cl.
*G05B 19/042* (2006.01)
*G05B 19/4155* (2006.01)
*G05D 1/02* (2006.01)
*A01D 41/127* (2006.01)

(52) U.S. Cl.
CPC ....... *G05B 19/042* (2013.01); *G05B 19/4155* (2013.01); *G05D 1/021* (2013.01); *A01D 41/127* (2013.01); *G05B 2219/25167* (2013.01); *G05B 2219/45017* (2013.01)

(58) Field of Classification Search
CPC .............. G05B 19/042; G05B 19/4155; G05B 2219/25167; G05B 2219/45017; G05D 1/021; A01B 79/005
USPC ....................................................... 700/275
See application file for complete search history.

(56) References Cited

U.S. PATENT DOCUMENTS

| | | | | |
|---|---|---|---|---|
| 4,338,669 A | * | 7/1982 | Skarvada | B60T 8/17616 303/154 |
| 5,775,072 A | * | 7/1998 | Herlitzius | A01D 41/1276 460/4 |
| 5,825,657 A | * | 10/1998 | Hernandez | G01H 1/003 702/182 |
| 5,878,557 A | * | 3/1999 | Wyffels | A01D 41/127 460/1 |
| 6,119,442 A | * | 9/2000 | Hale | A01D 41/1277 56/10.2 H |
| 6,591,145 B1 | * | 7/2003 | Hoskinson | A01D 41/127 460/1 |
| 8,469,784 B1 | * | 6/2013 | Hoskinson | A01D 41/127 460/1 |
| 2003/0060245 A1 | * | 3/2003 | Coers | A01D 41/127 460/2 |

(Continued)

FOREIGN PATENT DOCUMENTS

WO    2012045559 A1    4/2012

OTHER PUBLICATIONS

Extended European Search Report Application No. 16184273.7, dated Feb. 15, 2017, 6 pages.

(Continued)

*Primary Examiner* — Brian W Wathen
*Assistant Examiner* — Mohammed Shafayet
(74) *Attorney, Agent, or Firm* — Joseph R. Kelly; Kelly, Holt & Christenson PLLC

(57) ABSTRACT

Sensor signal values, indicative of a performance metric, are received and recorded over a given time period. The sensor signal values are aggregated, and a threshold signal value is identified based on the aggregated sensor signal value. A set of control signals, for controlling subsystems on the mobile machine, are generated based on the identified threshold signal value, and the subsystems are controlled based upon the control signals.

19 Claims, 15 Drawing Sheets

(56) References Cited

U.S. PATENT DOCUMENTS

| | | | | |
|---|---|---|---|---|
| 2006/0271243 A1* | 11/2006 | Behnke | ................ | A01D 41/127 700/284 |
| 2006/0272307 A1* | 12/2006 | Behnke | ................ | A01D 41/127 56/10.2 R |
| 2007/0005209 A1* | 1/2007 | Fitzner | ................ | A01B 79/005 701/50 |
| 2008/0039960 A1* | 2/2008 | Kadir | .................... | G06F 17/18 700/73 |
| 2009/0192634 A1* | 7/2009 | Fujinaka | ................ | G05B 11/42 700/42 |
| 2011/0084910 A1* | 4/2011 | Almalki | .................. | G06F 3/016 345/173 |
| 2013/0090747 A1* | 4/2013 | Grieb | ................ | G05B 13/0205 700/28 |
| 2013/0264871 A1* | 10/2013 | Zerbe | ........................ | G06F 1/26 307/31 |
| 2014/0336818 A1* | 11/2014 | Posselius | ............ | G05D 1/0295 700/248 |
| 2014/0368259 A1* | 12/2014 | Slechta | .................... | G01L 9/02 327/516 |
| 2015/0199630 A1 | 7/2015 | Pfeiffer | | |
| 2016/0131068 A1* | 5/2016 | Hardy | ................ | F02D 41/2477 701/115 |
| 2016/0223673 A1* | 8/2016 | Smith | ...................... | G01S 17/89 |
| 2017/0083006 A1* | 3/2017 | French, Jr. | ......... | G05B 19/4155 |

OTHER PUBLICATIONS

Communication pursuant to Artcle 94(3) EPC Application No. 16184273.7-12.04 dated Oct. 20, 2018, 7 pages.

* cited by examiner

US 10,234,837 B2

ADAPTIVE PERFORMANCE TARGETS FOR CONTROLLING A MOBILE MACHINE

FIELD OF THE DESCRIPTION

The present description relates to controlling a mobile machine. More specifically, the present description relates to adaptively identifying performance targets used to control the mobile machine.

BACKGROUND

There are a wide variety of different types of mobile machines. Some such machines include agricultural machines, construction machines, machines used in the forestry industry, and machines used in turf management, among others.

Such machines can also be controlled by a variety of different types of control systems. Some control systems use sensors or other mechanisms to measure variables that are indicative of the performance of the machine. They allow a user to set a setpoint or threshold value that the machine control system uses to control subsystems of the machine in order to achieve a desired performance target.

However, such machines often operate in a wide variety of different types of conditions. Agricultural machines, for instance, can operate on a variety of different crops, and under a variety of different conditions. Similarly, variation often exists from machine-to-machine, and from condition-to-condition. Thus, control thresholds or setpoints are often set conservatively, such that they can be used in a variety of different conditions, on a variety of different machines. Others allow a user to select a set of conditions, and the control system accesses a setpoint or control thresholds (for example, from a table) that is correlated to those conditions.

Still other systems rely on a user to set a static setpoint, or control threshold. For instance, an operator may provide inputs causing the machine to enter a mode in which the control thresholds or setpoints are to be set. The machine then allows the user to manually adjust machine settings to achieve a desired machine performance and then provide a user input. In response, the machine captures the current variable values (that are indicative of machine performance), and uses one or more of those values as control thresholds or setpoints in controlling the machine. All of these types of systems have the user select a static control threshold or setpoint to control the machine to achieve a desired performance target.

The discussion above is merely provided for general background information and is not intended to be used as an aid in determining the scope of the claimed subject matter.

SUMMARY

Sensor signal values, indicative of a performance metric, are received and recorded over a given time period. The sensor signal values are aggregated and a threshold signal value is identified base on the aggregated sensor signal values. A set of control signals, for controlling subsystems on the mobile machine, are generated based on the identified threshold signal value, and the subsystems are controlled based upon the control signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
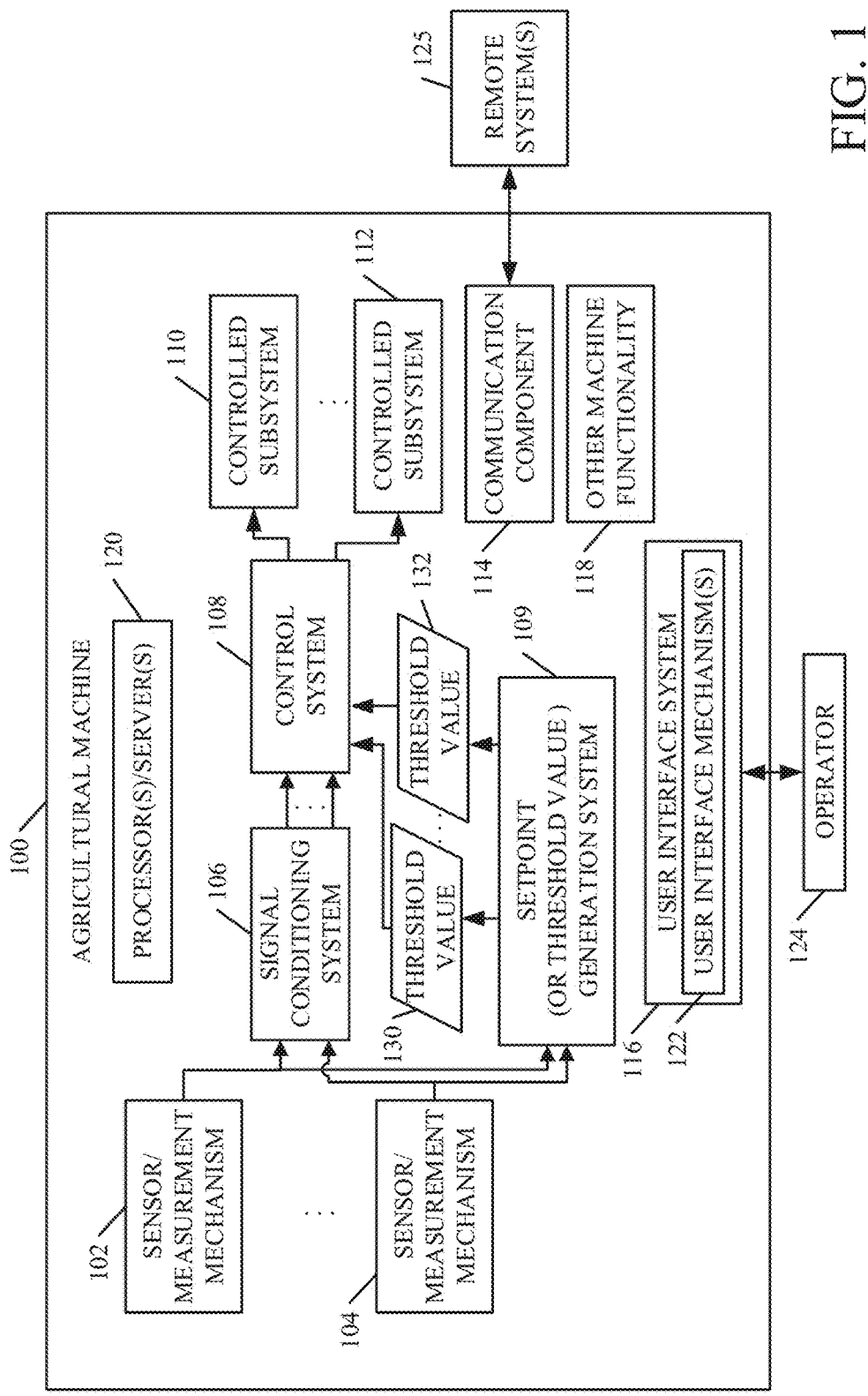
FIG. 1 is a block diagram of one example of an agricultural machine.

FIG. 1 is a block diagram of one example of an agricultural machine 100. Machine 100 illustratively has a set of sensors or measurement mechanisms 102-104. Machine 100 also illustratively includes signal conditioning system 106, control system 108, and a set of controlled subsystems 110-112. It can also include communication component 114, user interface system 116, and it can include a variety of other machine functionality 118. Machine 100 is also shown with one or more processors or servers 120.

In one example, user interface system 116 illustratively includes a set of user interface mechanisms 122. Operator 124 can interact with the user interface mechanisms 122 in order to control and manipulate agricultural machine 100. In one example, mechanisms 122 include one or more display devices, audio devices for providing audio information, haptic devices that provide haptic feedback, levers, joysticks, steering wheels, pedals, buttons, etc. User interface mechanisms 122 can also have a set of input mechanisms displayed on a user interface display. For instance, they can be links, icons, or other actuatable mechanisms.

Sensors or measurement mechanisms 102-104 illustratively generate signals representative of sensed variables, and provide them to signal conditioning system 106. The sensed variables can be from a wide range of different sensed variables, and some of them can be indicative of how well agricultural machine 100 is performing. By way of example, where agricultural machine 100 is a harvesting machine (such as a combine), the signals may include a grain loss signal that indicates an amount of harvested grain being lost during the harvesting process. They may include a throughput signal indicative of a quantity or rate of throughput through the combine. The sensor signals may include a grain quality signal indicative of an amount of material other than grain (MOG) that is entering the clean grain tank. The signal may also indicate the quality of the grain, itself, that is entering the clean grain tank, such as whether it is being cracked during the harvesting process, etc. The signals may measure (or be used to calculate) a fuel efficiency metric, or a power consumption efficiency metric that is indicative of how efficiently agricultural machine 100 is operating, during the harvesting operation. They can also include a productivity metric which is indicative of the overall productivity of the machine, during the harvesting operation. These, and a number of other sensors or measurement mechanisms are described in more detail below with respect to FIG. 2.

Signal conditioning mechanism 106 can perform a wide variety of different kinds of signal conditioning. For instance, it can perform amplification, linearization, normalization, other types of compensation or filtering, etc.

Control system 108 receives signals (either directly from sensors or measurement mechanisms 102-104, or after they have been conditioned by system 106) and generates a set of control signals. The control signals are used to control the various controlled subsystems 110-112 on agricultural machine 100.

In addition, setpoint (or control threshold) value generation system 109 also illustratively receives one or more of the sensor or measurement signals from sensors or measurement mechanisms 102-104. Again, they can be received directly from mechanisms 102-104, or from signal conditioning system 106. Setpoint (or threshold) value generation system 109 generates a set of control thresholds (or control setpoints) 130-132 (hereinafter referred to as control thresholds or threshold values), based upon the input signals, and provides the control thresholds 130-132 to control system 108. Control system 108 illustratively generates the control signals for controlling subsystems 110-112, based on the input signals from sensors or measurement mechanisms 102-104, and based on the control thresholds 130-132. Control system 108 thus attempts to control the subsystems 110-112 so that the performance of machine 100 reaches a point where the threshold sensor signals meet the control thresholds 130-132.

Setpoint threshold value generation system 109 intermittently (or continuously), and automatically, updates the control thresholds 130-132, as long as the performance of machine 100 is improving. By automatically it is meant that the system performs without any human involvement, except, perhaps, to start, or authorize, the operation. Thus, the threshold values 130-132 are automatically set, and are dynamically updated. This type of iterative process drives the performance of machine 100 to improve, until the threshold values stabilize. This is described in greater detail below with respect to FIGS. 3 and 4.

Figure 2:
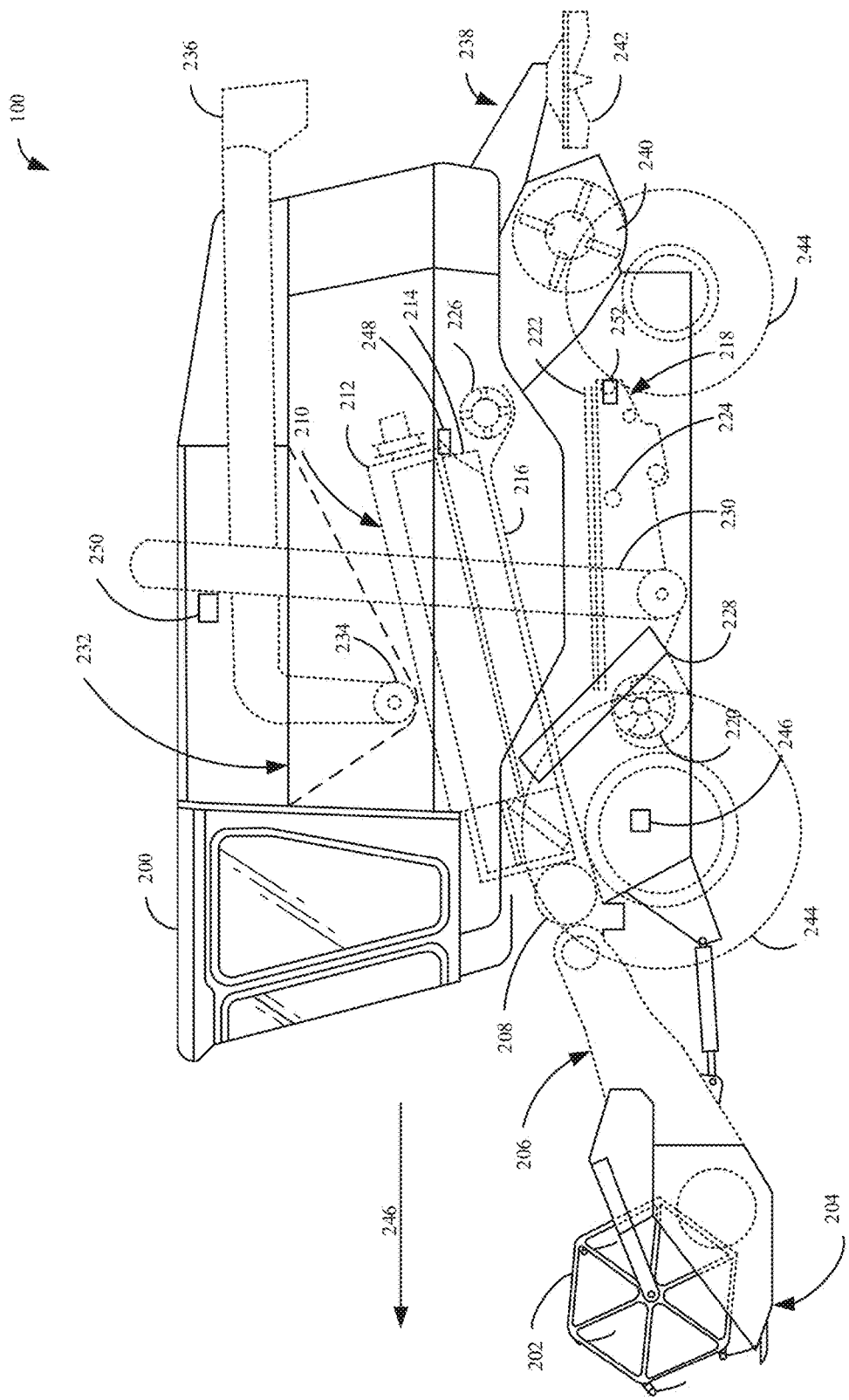
FIG. 2 is a partial pictorial, partial schematic, view of an example in which the mobile machine is a combine.

FIG. 2 is a partial pictorial, partial schematic, illustration of agricultural machine 100, in an example where machine 100 is a combine. It can be seen in FIG. 2 that combine 100 illustratively includes an operator compartment 200, and a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 100 can include a separator 216 that includes a separator rotor. Combine 102 can include a cleaning subsystem (or cleaning shoe) 218 that, itself, can include a cleaning fan 220, chaffer 222 and sieve 224. The material handling subsystem in combine 102 can include (in addition to a feeder house 206 and feed accelerator 208) discharge beater 226, tailings elevator 228, clean grain elevator 230 (that moves clean grain into clean grain tank 232) as well as unloading auger 234 and spout 236. Combine 102 can further include a residue subsystem 238 that can include chopper 240 and spreader 242. Combine 102 can also have a propulsion subsystem that includes an engine that drives ground engaging wheels 244 or tracks, etc. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 246. As it moves, header 202 engages the crop to be harvested and gathers it toward cutter 204. After it is cut, it is moved through a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 102 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 102 can include ground speed sensor 246, one or more separator loss sensors 248, a clean grain camera 250, and one or more cleaning shoe loss sensors 252. Ground speed sensor 246 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensor/measurement mechanisms 102-104 (in addition to the sensors already described) can include other sensors on combine 100 as well. For instance, they can include a machine state sensor that is configured to sense whether machine 100 is configured to chop the residue, drop a windrow, etc. They can include cleaning shoe fan speed sensors that can be configured proximate fan 220 to sense the speed of the fan. They can include a material other than grain (MOG) moisture sensor that can be configured to sense the moisture level of the material other than grain that is passing through machine 100. They can include machine setting sensors that are configured to sense the various configurable settings on machine 100. They can also include a machine orientation sensor that can be any of a wide variety of different types of sensors that sense the orientation of machine 100. Crop property sensors can sense a variety of different types of crop properties, such as crop type, crop moisture, and other crop properties. They can also be configured to sense characteristics of the crop as they are being processed by machine 100. For instance, they can sense grain feed rate, as it travels through clean grain elevator 230. They can sense mass flow rate through elevator 230, or provide other output signals indicative of similar variables. Some additional examples of the types of sensors that can be used are described below with respect to FIG. 3.

Figure 3:
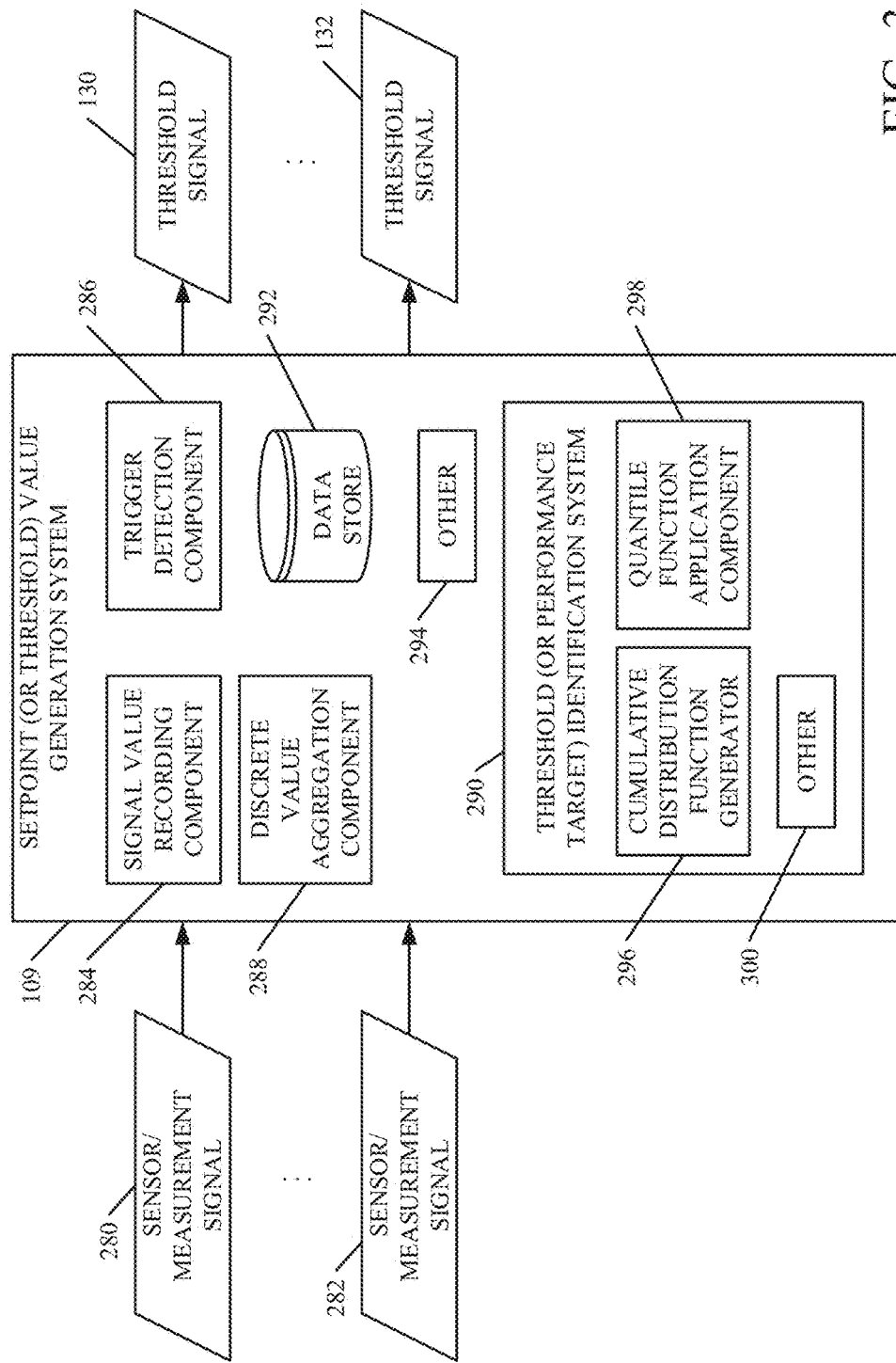
FIG. 3 is a block diagram showing one example of a control system, in more detail.

FIG. 3 is a block diagram showing one example of setpoint threshold value generation system 109 in more detail. FIG. 3 shows that system 109 illustratively receives sensor signals 280-282 from the various sensors or measurement mechanisms 102-104. It generates the threshold setpoint values 130-132 and provides them to control system 108.

In the example shown in FIG. 3, system 109 illustratively includes signal value recording component 284, trigger detection component 286, discrete value aggregation component 288, threshold identification system 290, data store 292, and it can include other items 294. Threshold identification system 290 illustratively includes cumulative distribution function generator 296, quantile function application component 298, and it can include other items 300.

Trigger detection component 286 illustratively identifies when triggering conditions are met that trigger system 109 to identify a new set of threshold values. Signal value recording component 284 illustratively records discrete values of the signals 280-282 that are received. This can be done intermittently, over a given period of time, or it can be done continuously. Discrete value aggregation component 288 aggregates the discrete values that have been recorded, into groups, and cumulative distribution function generator 296 applies a cumulative distribution function to those values, that maps the values to performance targets. Quantile function application component 298 applies a quantile function to identify a particular threshold value based upon a selected performance target, and outputs that value as a threshold signal 130-132, which represents the value. Data store 292 can be used to store the recorded signal values, the aggregated values, or any values generated by system 290, or other information.

Figure 4A:
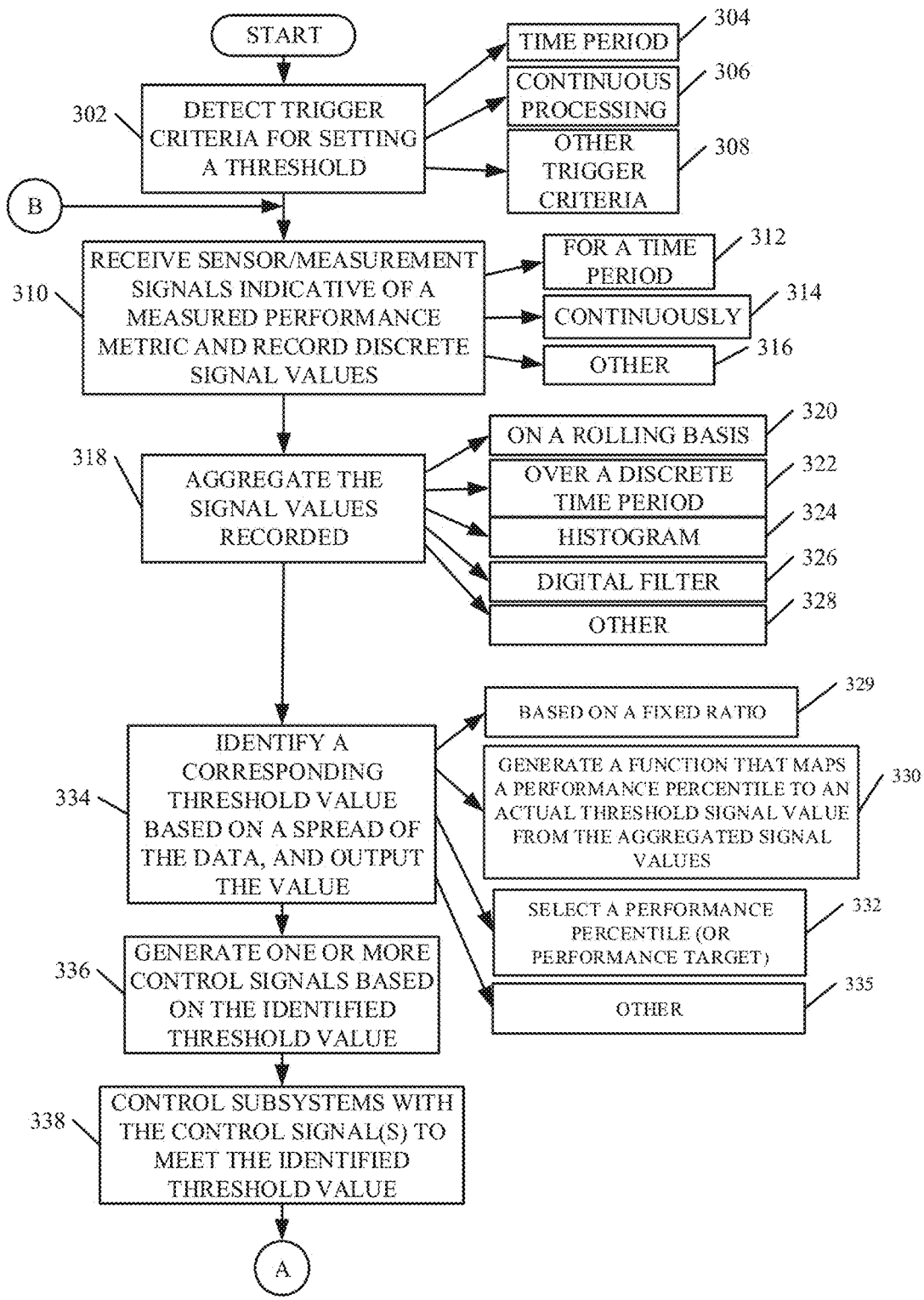
FIGS. 4A and 4B (collectively referred to herein as FIG. 4) show a flow diagram illustrating one example of the operation of the control system shown in FIG. 3.
Figure 4B:
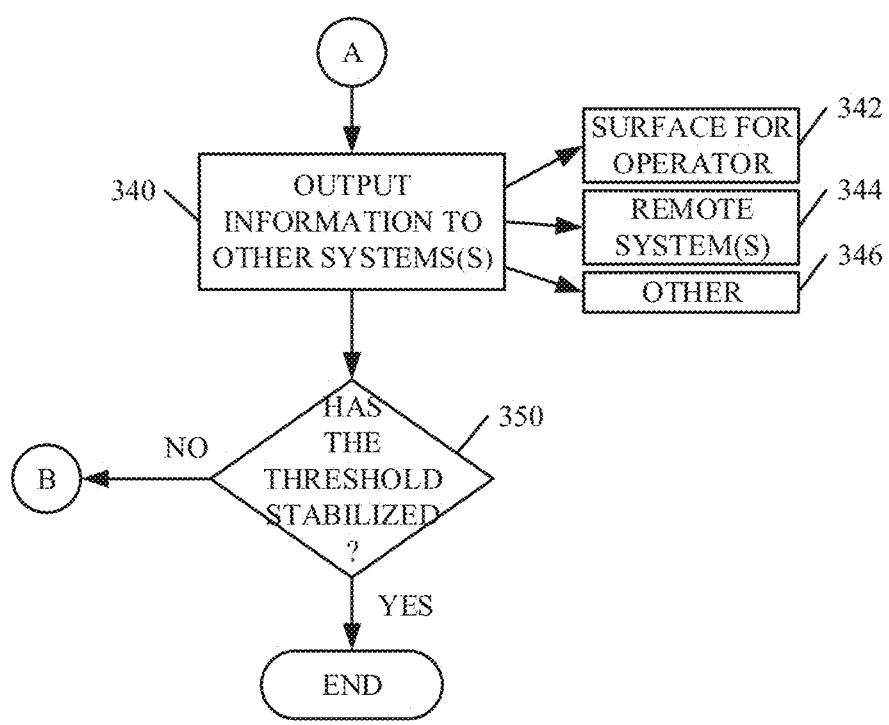

FIGS. 4A and 4B (collectively referred to herein as FIG. 4) show a flow diagram illustrating one example of the operation of threshold generation system 109 and control system 108. Trigger detection component 286 first detects trigger criteria for setting a threshold that can be used by control system 108. This is indicated by block 302 in FIG. 4. The trigger criteria can be any of a variety of different types of criteria. For instance, the thresholds can be calculated on a periodic basis or on an otherwise intermittent basis. Thus, the passage of a time period 304 may trigger detection component 286 to indicate that the triggering criteria are present. Alternatively, the processing can be done continuously, on a rolling basis. Therefore, the triggering criteria may simply be that the mobile machine is operating. Continuous processing is indicated by block 306. The triggering criteria can be a wide variety of other triggering criteria 308 as well.

Once the triggering criteria are met, then signal value recording component 284 illustratively receives sensor signals or measurement signals that are indicative of a performance metric for machine 100, and records discrete signal values for that signal. This is indicated by block 310.

Figure 5:
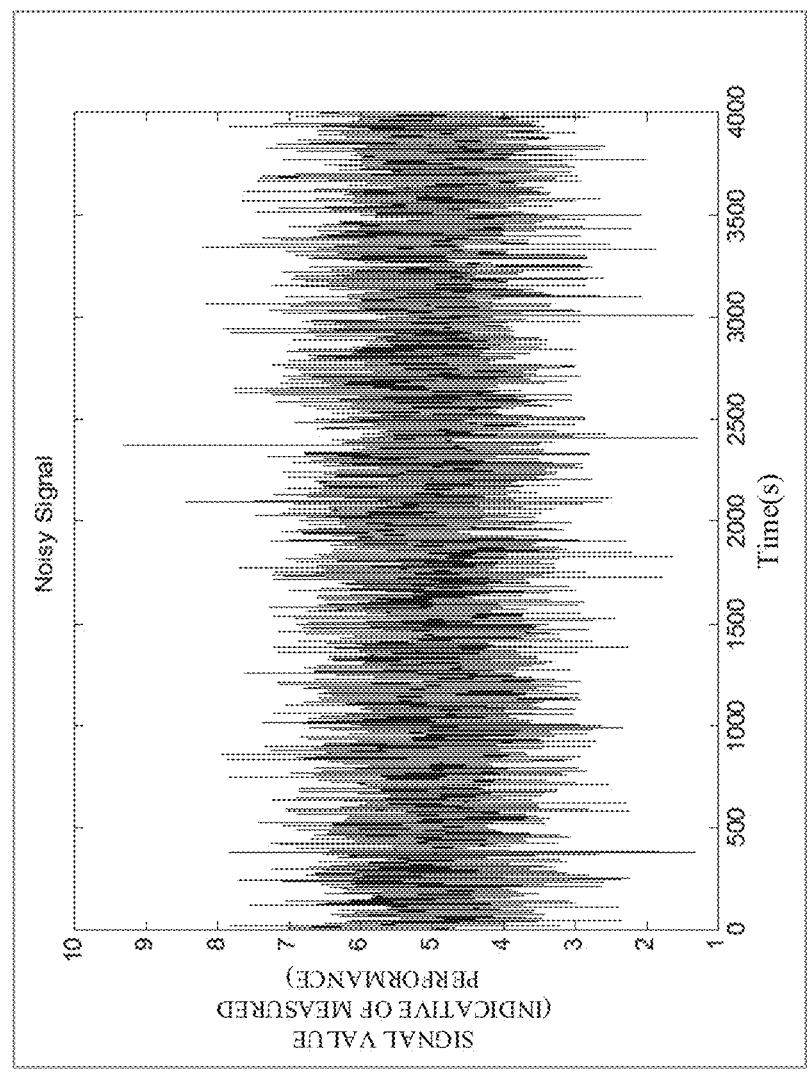
FIG. 5 shows one example of a signal that is recorded and that is indicative of a measured variable used to set a control threshold or setpoint.

FIG. 5, for instance, shows one example of a sensor signal value. For purposes of the present example, assume that the signal shown in FIG. 5 represents measured grain loss. FIG. 5 shows that the signal value ranges between approximately 2 and approximately 8, over a 4,000 second time period. Because the signal represents grain loss, the lower the signal, the better combine 100 is performing.

In one example, signal value recording component 284 records the signal, or records individual or discrete values for the signal, over the given time period. Recording the signal for a time period is indicated by block 312. Alternatively, the signal can be continuously recorded, as indicated by block 314. The signal can be recorded in other was as well, and this is indicated by block 316.

Discrete value aggregation component 288 then aggregates the discrete values that are recorded for the input signal into categories. This is indicated by block 318 in FIG. 4. In one example, the signals are aggregated into categories on a rolling basis. Therefore, the current signals that are aggregated into the categories may replace older signals that were previously added into the categories. This is indicated by block 320. Alternatively, the signals can be aggregated for a discrete time period, where no rolling information is considered. This is indicated by block 322.

The aggregation can be performed using histograms 324. That is, the signal values can be placed into a histogram. Thus, the range of values is divided into consecutive bins of non-overlapping intervals of the measured variable and then a count of the number of discrete signal values recorded over the given time period that fall into each bin is represented by the histogram. The histogram can also be normalized so that each bar in the histogram shows a proportion of values that fall into each bin, with the sum of all bins (or heights) equaling 1. This shows the relative frequencies of the values falling into each bin. The signal values can be aggregated into categories using a digital filter 326, or in other ways 328 as well.

Figure 6:
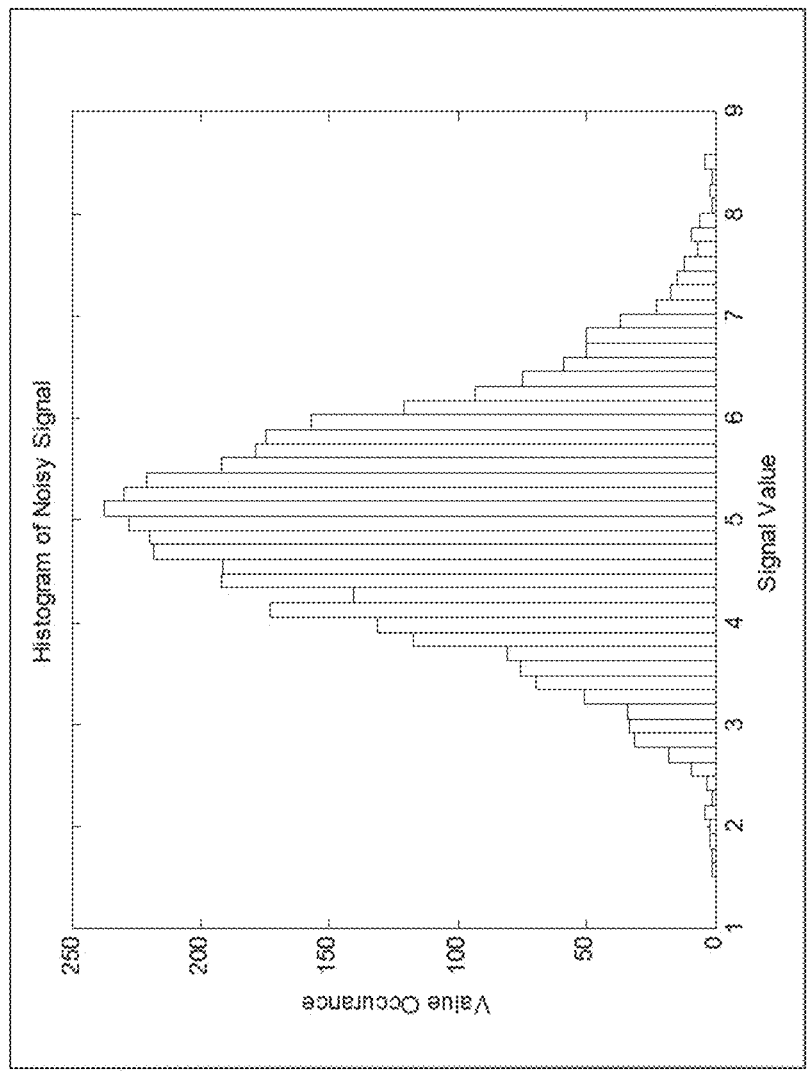
FIG. 6 is a graph showing signal values for the signal recorded in FIG. 5, aggregated into a histogram representation.

FIG. 6 shows one example of a histogram that is generated from the discrete signal values captured for the signal shown in FIG. 5. It can be seen that the histogram divides the range of signal values into consecutive bins of non-overlapping intervals of the measured signal, with each interval being approximately 0.14 signal value units (e.g., if the signal value is measured in Volts, then each bin represents 0.14 Volts). The number of occurrences in each bin ranges from 0 to approximately 250. The spread of the histogram along the signal value axis represents the signal noise.

Threshold identification system 290 then identifies a threshold signal value, (based upon the spread in the aggregated signal values) and outputs it to control the subsystems of combine 100. This is indicated by block 334. In one example, the threshold value is identified by using a fixed ratio or other metric relative to the spread of the data (such as one or two standout deviations, etc.). This is indicated by block 329.

The threshold can be identified in other was as well. For instance, in one example, cumulative distribution function generator 296 generates a function from the histogram shown in FIG. 6 that maps a performance percentile to an actual threshold signal value from the aggregated signal values in the histogram. This is indicated by block 330. Function generator 296 can, for instance, integrate over the histogram shown in FIG. 6 to generate the cumulative distribution function. One example of this is shown in FIG. 7.

Figure 7:
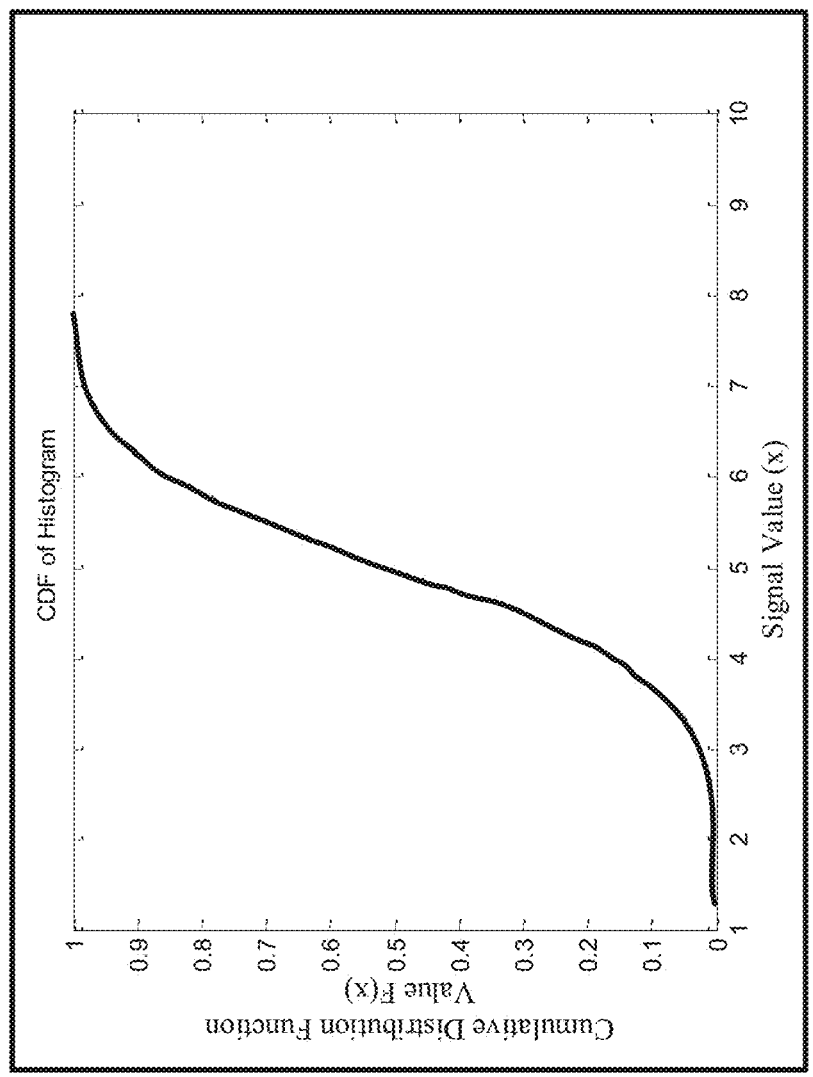
FIG. 7 is a graph of a cumulative distribution function generated from the histograms (e.g., the aggregated signal values) shown in FIG. 6.
Figure 8:
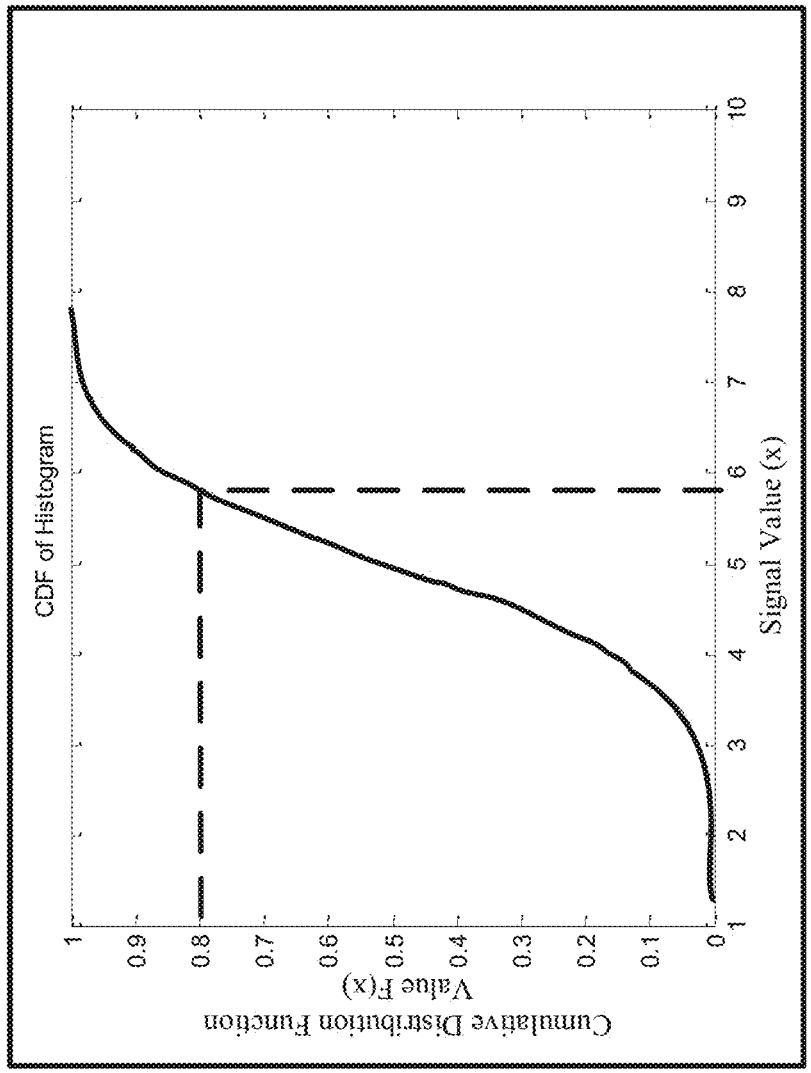
FIG. 8 illustrates a quantile function that can be used to identify a control threshold value or setpoint from a desired performance target.

It can be seen in FIG. 7 that the cumulative distribution function f(x) on the y axis is an integral of the values in the histogram shown in FIG. 6. It also maps the values of the cumulative distribution function on the y axis to actual signal values (or control thresholds) on the x axis. Thus, in order to identify a threshold value for controlling combine 100, quantile function application component 298 first selects a value on the y axis that represents a performance percentile (or performance target) and then identifies a corresponding threshold value on the x axis, and outputs that value. Selecting the performance percentile is indicated by block 332. in FIG. 4. FIG. 8 shows one example of this.

It can be seen that, in the example shown in FIG. 8, the performance percentile (or the value of the cumulative distribution function on the y axis) is selected as 0.8. This maps to a signal value on the x axis of approximately 5.8. Thus, system 109 provides the value of 5.8 as the threshold value for the given input signal that measures grain loss. This signal is provided to control system 108.

The threshold value can be identified in other ways as well. This is indicated by block 335.

Control system 108 then generates one or more control signals based upon the identified threshold value. This is indicated by block 336. It uses the control signal to control one or more subsystems to meet the identified threshold value (which corresponds to the identified performance target). This is indicated by block 338. It can also output any information that was used, along with the threshold value itself, to other systems. This is indicated by block 340. For instance, it can output the information to the user interface system 116 to surface it for the user. This is indicated by block 342. It can output the information to remote systems 125, using communication component 114. This is indicated by block 344. It can output it in other ways as well. This is indicated by block 346.

By selecting a threshold value (that represents a performance target)) for control system 108, and then allowing control system 108 to control the subsystems 110-112 in order to meet that performance target, control system 108 will continuously drive the control of agricultural machine 100 to improve, until the performance target (the corresponding threshold value) stabilizes. For instance, once the threshold value of 5.8 (which corresponds to a performance target of the $80^{th}$ percentile) is set for control system 108, and control system 108 controls subsystems 110-112 to meet that target, then processing may again return to block 302 where a new performance target is calculated.

Figure 9:
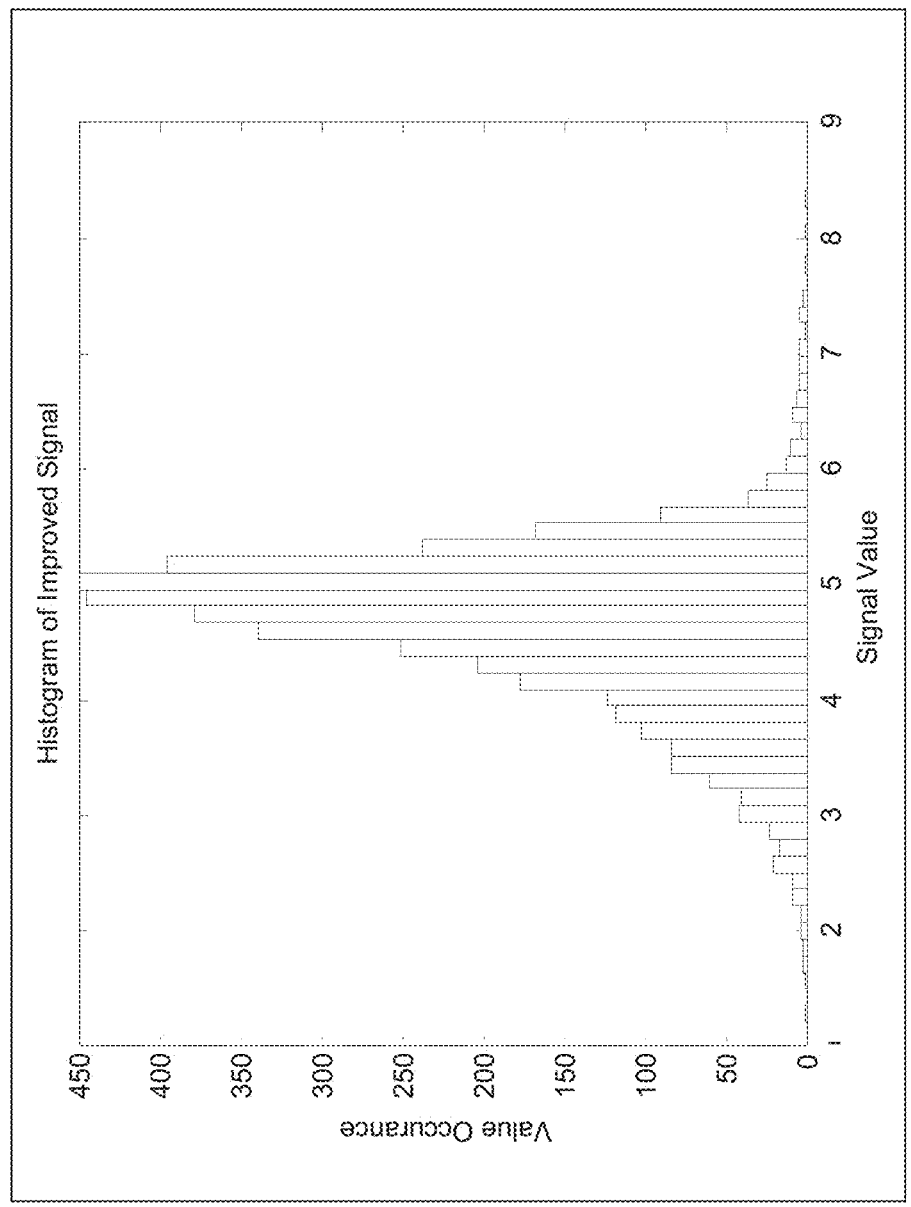
FIGS. 9 and 10 illustrate how the signal values and selected performance targets can be chosen iteratively, to improve machine performance.

The signal can again be received and discrete values can be recorded and aggregated into a histogram. FIG. 9 shows one example of such a histogram. The occurrence of the discrete signal values that are above the threshold signal (and hence those signal values representing performance that is worse than the performance target) is significantly reduced over the occurrence of the values shown in FIG. 6. Thus, when the cumulative distribution function is applied to the histogram shown in FIG. 9, and the $80^{th}$ performance percentile is again selected, the corresponding threshold signal value will now be less than 5.8. In the example shown in FIG. 9, it may be slightly less than 5.0. This is again output to the control system 108 as the new control threshold, and control system 108 continues to control the controlled subsystems 110-112 in order to meet the new, and better, performance target. Through iteration, this process allows control system 108 to continuously improve the operation of agricultural machine 100, with respect to the performance targets identified, until threshold values stabilize. That is, it continues to improve the operation of agricultural machine 100 until the performance targets no longer decrease or no longer decrease by a threshold amount, from one iteration to the next.

Figure 10:
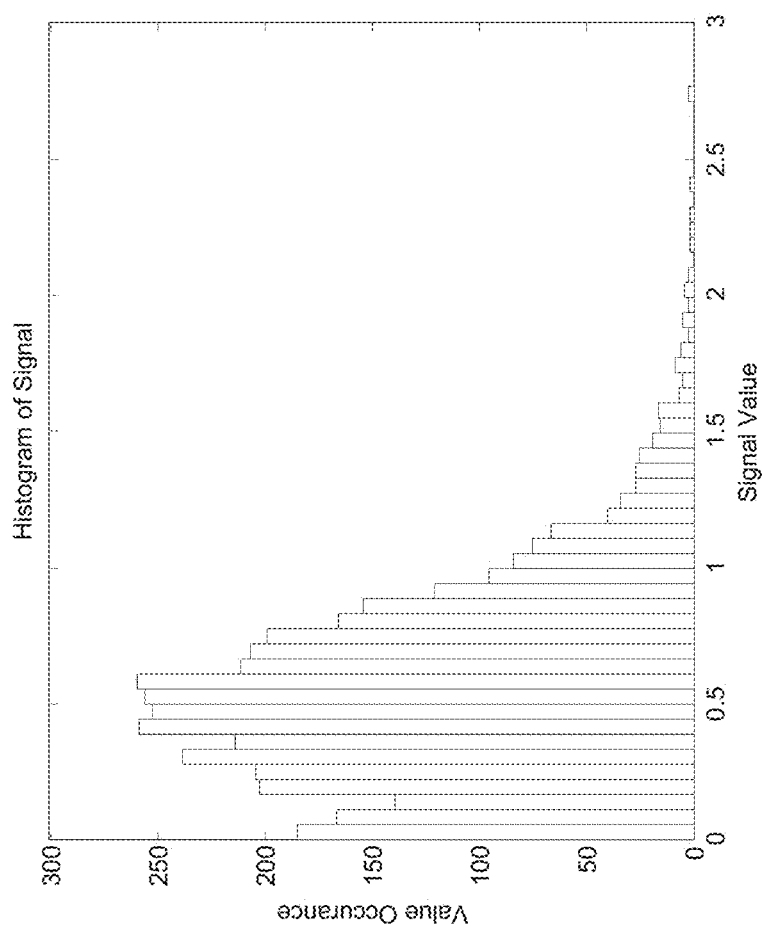

FIG. 10 is a histogram showing one example of the signal values after system 109 has iterated through this process a number of times. It can be seen that the signal values have been significantly reduced, and thus the performance of machine 100 with respect to those signal values (e.g., with respect to measured grain loss) has been significantly increased. Thus, by iterating through the process of setting new performance targets for each signal, and then controlling the subsystems to meet those new performance targets, the performance of the machine continues until those performance targets stabilize.

It will also be noted that in the example described above, the signal that is indicative of the performance target is a grain loss signal. Therefore, the lower the signal, the better the performance of machine 100 with respect to grain loss. However, the signal may be a signal in which improvement is represented by higher number, instead of a lower number. By way of example, if the signal represents throughput, or fuel efficiency, it may be that higher numbers represent improvement. In that case, by iterating on the above process, control system 108 will drive the performance of machine 100 so that the signal levels continue to increase (and thus represent improved performance) in the same way that the signal described above continued to decrease (and thus represent improved performance) until the signal stabilizes. Continuing to iterate through setting new performance targets (or threshold levels) until they stabilize is indicated by block 350 in FIG. 4.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures.

Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information and performance targets can be output to the cloud or another remote server environment.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
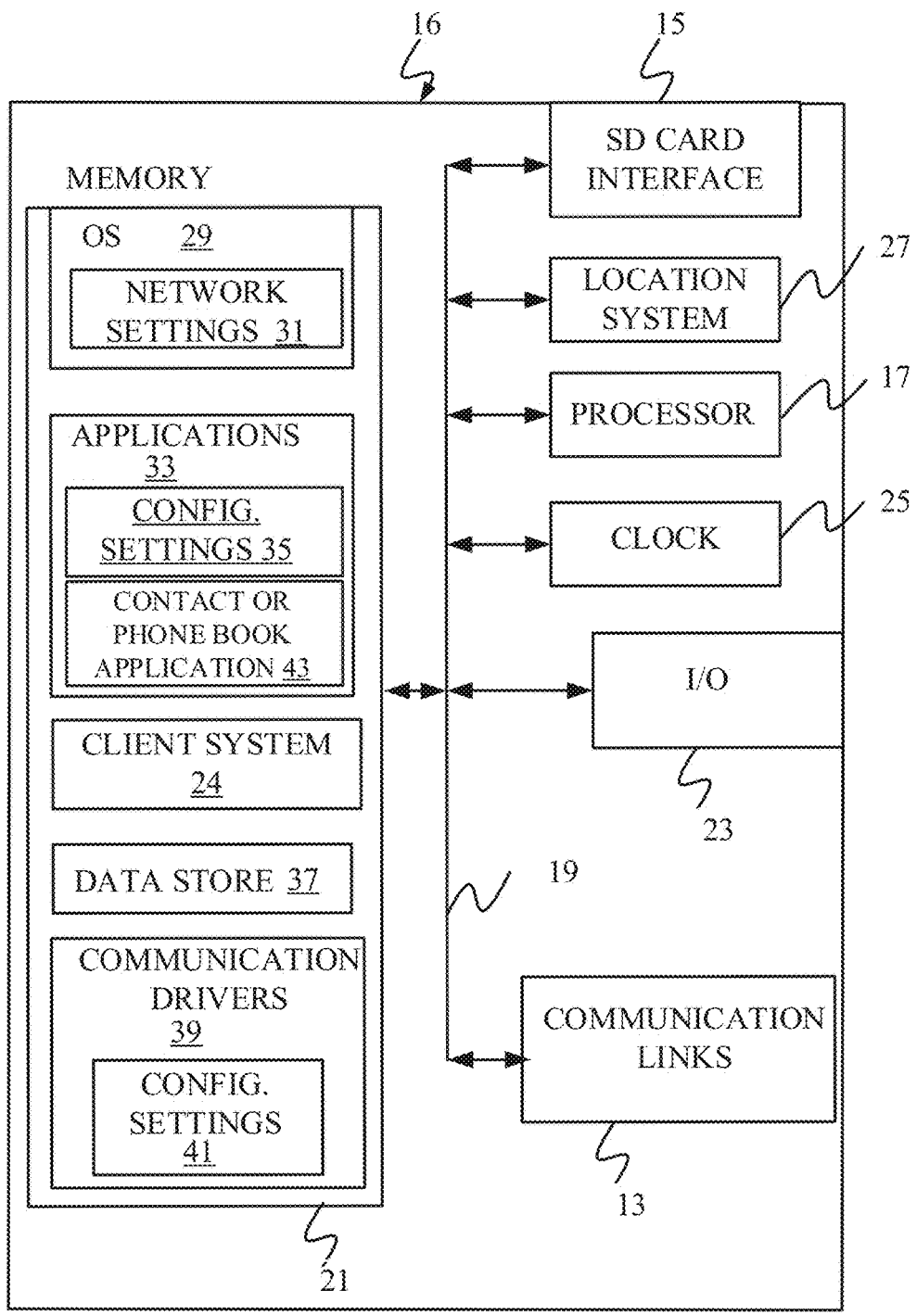
FIGS. 11-13 show examples of mobile devices.
Figure 12:
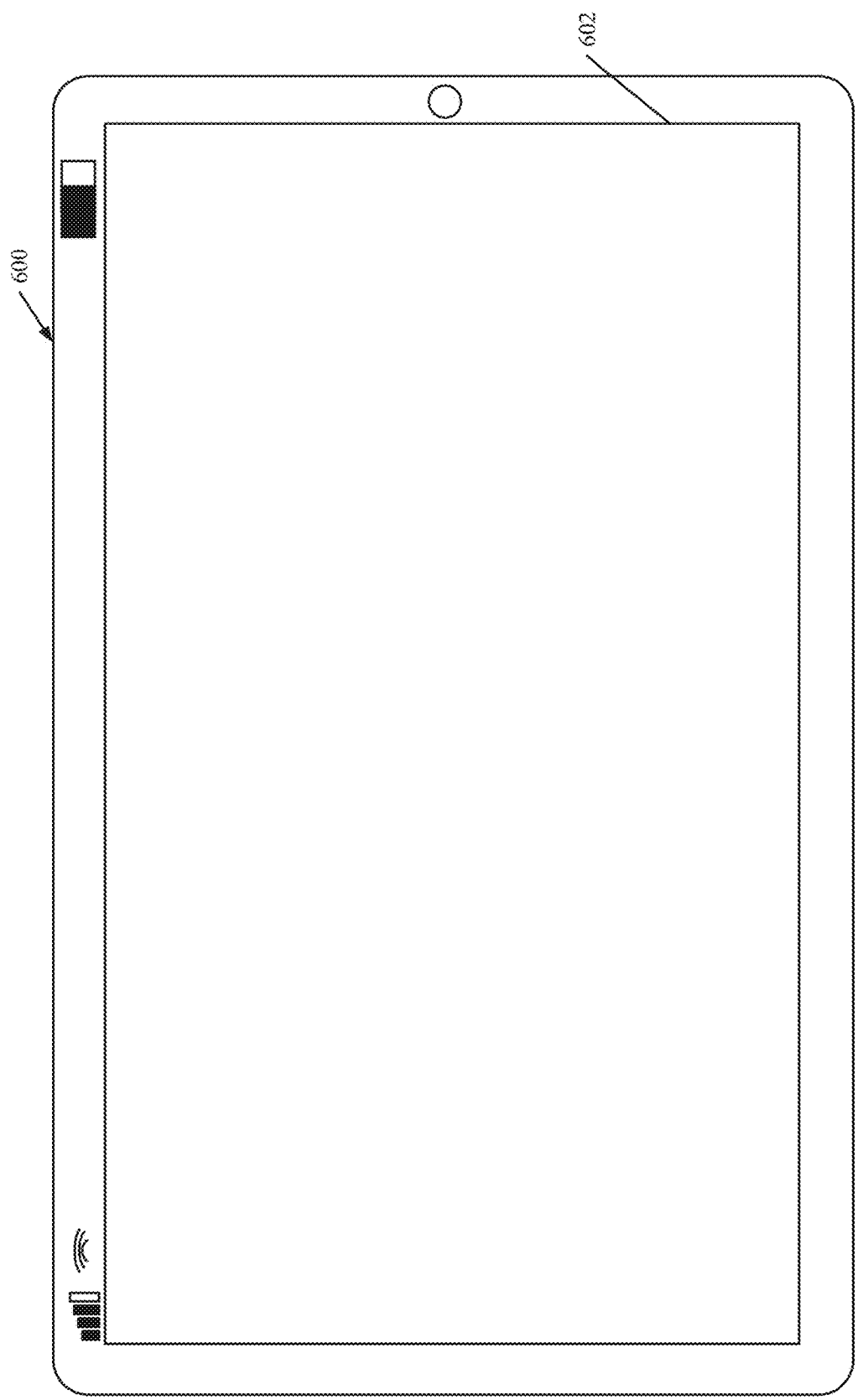
Figure 13:
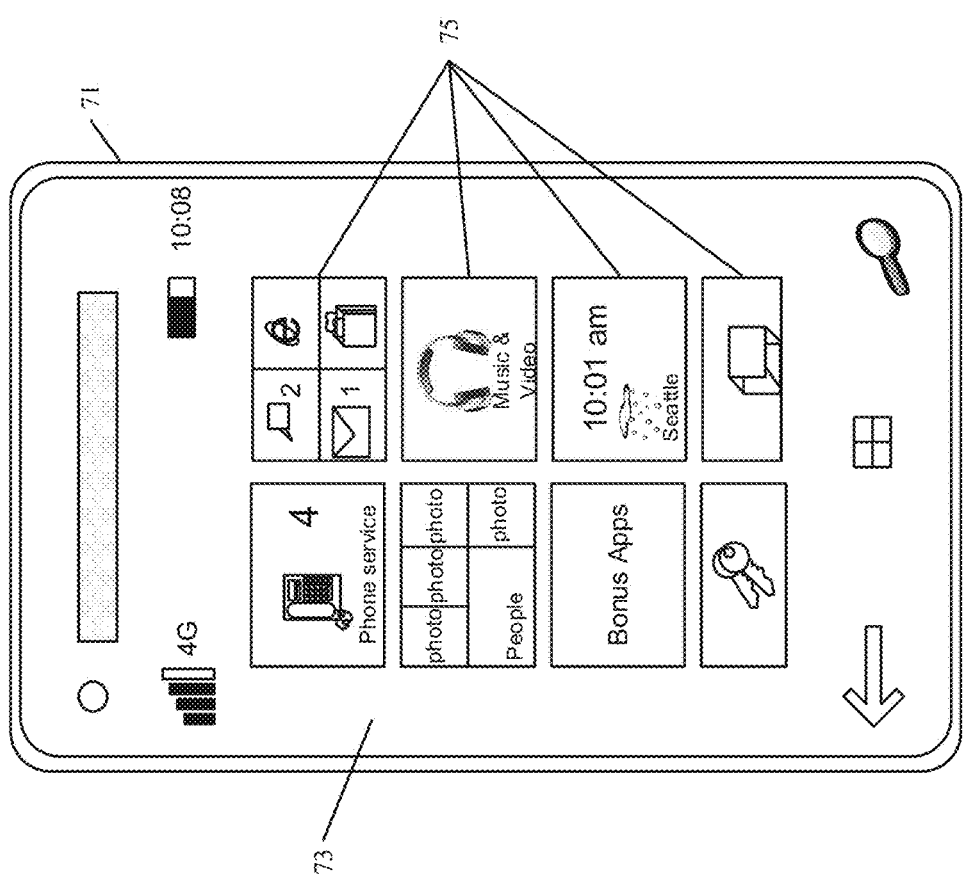

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural machine 100 for use in generating, processing, or displaying the performance targets and other data. FIGS. 12-13 are examples of handheld or mobile devices.

FIG. 11 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 120 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one embodiment in which device 16 is a tablet computer 600. In FIG. 12, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
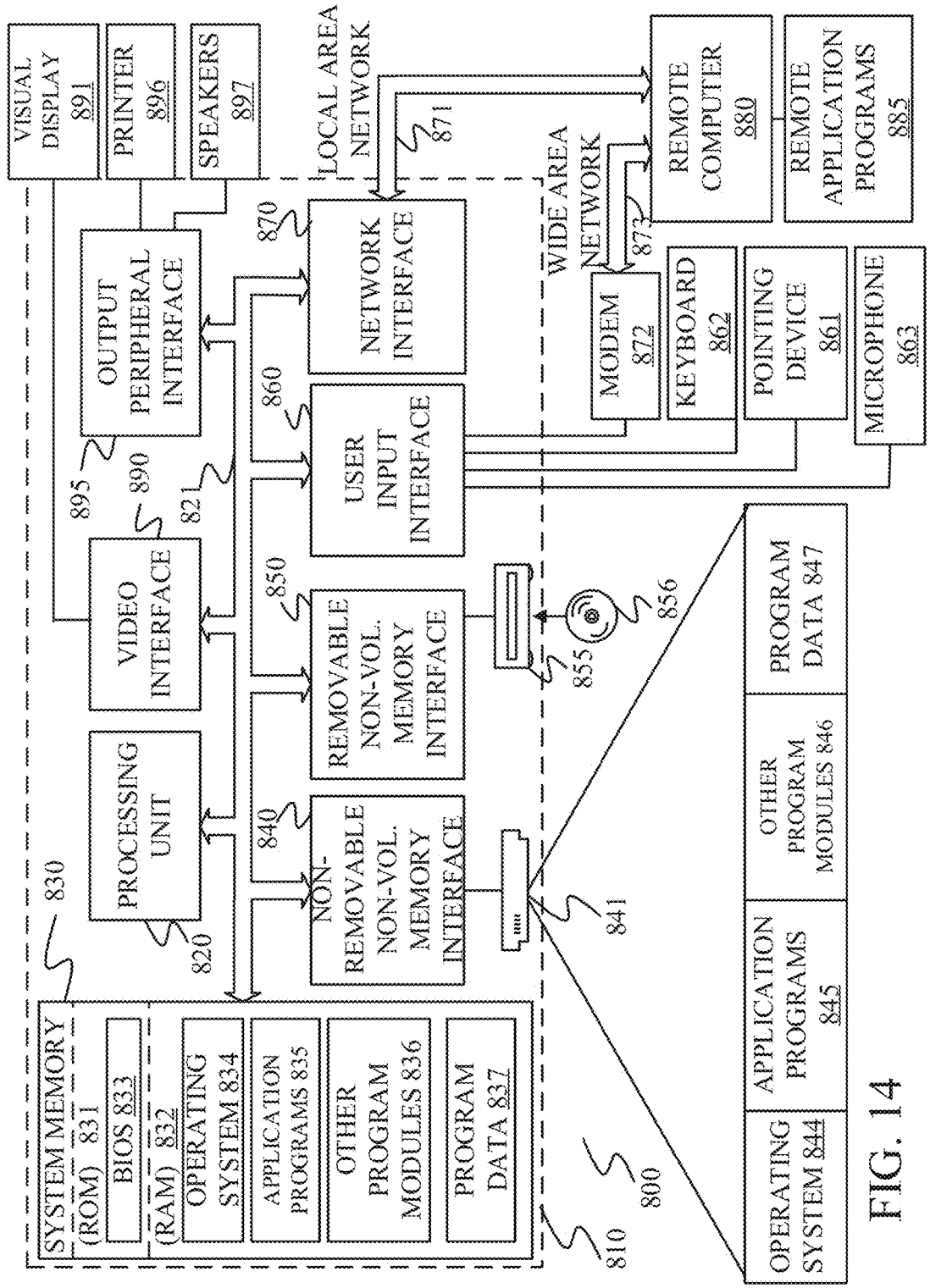
FIG. 14 is a block diagram of one example of a computing environment that can be used in the previous figures.

FIG. 14 is one example of a computing environment in which elements of FIG. 1, or parts of it, (for example) can be deployed. With reference to FIG. 14, an example system for implementing some embodiments includes a general-purpose computing device in the form of a computer 810. Components of computer 810 may include, but are not limited to, a processing unit 820 (which can comprise processor 120), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural machine, comprising:
a set of controllable subsystems that each perform a machine function;
a plurality of sensors, each sensing a corresponding variable on a given one of the controllable subsystems, and generating a sensor signal indicative of a value of the corresponding variable;
a control threshold generation system that receives a given sensor signal, obtains a set of sensor signal values indicative of values of the given sensor signal over a period of time, and automatically generates a control threshold signal, with a threshold value, based on the set of sensor signal values for the given sensor signal; and
a control system that generates a subsystem control signal that controls a given controllable subsystem based on the given sensor signal and based on the control threshold signal.

Example 2 is the agricultural machine of any or all previous examples wherein the control threshold generation system comprises:
a signal value recording component that records the set of sensor signal values, as discrete sensor signal values, at different points in time, over the period of time.

Example 3 is the agricultural machine of any or all previous examples wherein the control threshold generation system comprises:
a discrete value aggregation component that aggregates the discrete sensor signal values into groups of values.

Example 4 is the agricultural machine of any or all previous examples wherein the discrete value aggregation component comprises:
a histogram generation component that generates a histogram representation of the discrete sensor signal values.

Example 5 is the agricultural machine of any or all previous examples wherein the discrete value aggregation component comprises:
a digital filter that identifies a representative value in each group of values.

Example 6 is the agricultural machine of any or all previous examples wherein the control threshold generation system comprises:
a threshold identification system that identifies the threshold value of the control threshold signal based on the aggregated discrete sensor signal values.

Example 7 is the agricultural machine of any or all previous examples wherein the threshold identification system comprises:

a cumulative distribution function generator that generates a cumulative distribution function, based on the aggregated sensor signal values, that correlates a set of performance metrics to a set of threshold values.

Example 8 is the agricultural machine of any or all previous examples wherein the threshold identification system comprises:

a quantile function application component that identifies the threshold value for the control threshold signal, based on a selected performance metric, using the correlation of the set of performance metrics to the set of threshold values.

Example 9 is the agricultural machine of any or all previous examples wherein the control threshold generation system and the control system are configured to iteratively generate the control threshold signal, with a threshold value, based on the set of sensor signal values for the given sensor signal, and generate the subsystem control signal that controls the given controllable subsystem based on the given sensor signal and based on the control threshold signal, until the threshold value changes by less than a threshold amount from one iteration to a next iteration.

Example 10 is the agricultural machine of any or all previous examples wherein the control threshold generation system receives the given sensor signal, obtains the set of sensor signal values indicative of values of the given sensor signal over a period of time, on a rolling basis, and automatically generates the control threshold signal, with the threshold value, based on the set of sensor signal values for the given sensor signal.

Example 11 is the agricultural machine of any or all previous examples wherein the agricultural machine comprises a combine and wherein the set of controllable subsystems comprise:

a threshing subsystem;
a front end equipment subsystem;
a residue handling subsystem;
a propulsion subsystem;
a cleaning subsystem;
a material handling subsystem; and
a separation subsystem.

Example 12 is a method of controlling an agricultural machine, comprising:

sensing a variable on a given one of a plurality of different controllable subsystems on the agricultural machine;
generating a sensor signal indicative of a value of the variable;
obtaining a set of sensor signal values indicative of values of the sensor signal over a period of time;
automatically generating a control threshold signal, with a threshold value, based on the set of sensor signal values for the sensor signal; and
generating a subsystem control signal that controls a given controllable subsystem based on the sensor signal and based on the control threshold signal.

Example 13 is the method of any or all previous examples wherein obtaining the set of sensor signal values comprises:

storing the set of sensor signal values, as discrete sensor signal values, at different points in time, over the period of time.

Example 14 is the method of any or all previous examples wherein automatically generating the control signal threshold comprises:

aggregating the discrete sensor signal values into groups of values; and
identifying the threshold value of the control threshold signal based on the aggregated discrete sensor signal values.

Example 15 is the method of any or all previous examples wherein aggregating the discrete sensor signal values comprises:

generating a histogram representation of the discrete sensor signal values.

Example 16 is the method of any or all previous examples wherein identifying the threshold value comprises:

correlating a set of performance metrics to a set of threshold values based on the aggregated sensor signal values; and
identifying the threshold value for the control threshold signal, based on a selected performance metric, using the correlation of the set of performance metrics to the set of threshold values.

Example 17 is the method of any or all previous examples and further comprising:

iteratively generating the control threshold signal, with a threshold value, based on the set of sensor signal values for the given sensor signal, and generating the subsystem control signal that controls the given controllable subsystem based on the given sensor signal and based on the control threshold signal, until the threshold value stabilizes.

Example 18 is the method of any or all previous examples wherein the agricultural machine comprises a combine and wherein generating a subsystem control signal and controlling the set of controllable subsystems comprises controlling at least one of a threshing subsystem, a cleaning subsystem, a front end equipment subsystem, a residue handling subsystem, a propulsion subsystem, a material handling subsystem, and a separation subsystem.

Example 19 is a combine, comprising:

a set of controllable subsystems that each perform a function on the combine;
a plurality of sensors, each sensing a corresponding variable on a given one of the controllable subsystems, and generating a sensor signal indicative of a value of the corresponding variable;
a control threshold generation system that receives a given sensor signal, obtains a set of sensor signal values indicative of values of the given sensor signal over a period of time, and automatically generates a control threshold signal, with a threshold value, based on the set of sensor signal values for the given sensor signal; and
a control system that generates a subsystem control signal that controls a given controllable subsystem based on the given sensor signal and based on the control threshold signal.

Example 20 is the combine of any or all previous examples wherein the control threshold generation system comprises:

a signal value recording component that records the set of sensor signal values, as discrete sensor signal values, at different points in time, over the period of time;
a discrete value aggregation component that aggregates the discrete sensor signal values into groups of values;
a correlation component that correlates a set of performance metrics to a set of threshold values; and
a threshold identifying component that identifies the threshold value for the control threshold signal, based on a selected performance metric, using the correlation of the set of performance metrics to the set of threshold values.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine, comprising:
   a set of controllable subsystems that each perform a machine function;
   a plurality of sensors, each sensing a corresponding variable on a given one of the controllable subsystems, and generating a sensor signal indicative of a value of the corresponding variable;
   a control threshold generation system that receives a given sensor signal, obtains a set of sensor signal values indicative of values of the given sensor signal over a period of time, identifies a frequency with which the sensor signal values for the given sensor fall into each of a plurality of different ranges of values over the period of time and automatically generates a control threshold signal, with a threshold value that is in one of the plurality of different ranges of values where at least one sensor signal value for the given sensor fell, based on a given metric indicative of the identified frequencies over the period of time; and
   a control system that generates a subsystem control signal that controls a given controllable subsystem based on the given sensor signal and based on the control threshold signal, the control threshold generation system iteratively generating the control threshold signal until the threshold value changes by less than a threshold amount over a number of iterations.

2. The agricultural machine of claim 1 wherein the control threshold generation system comprises:
   a signal value recording component that records the set of sensor signal values, as discrete sensor signal values, at different points in time, over the period of time.

3. The agricultural machine of claim 2 wherein the control threshold generation system comprises:
   a discrete value aggregation component that aggregates the discrete sensor signal values into groups of values.

4. The agricultural machine of claim 3 wherein the discrete value aggregation component comprises:
   a histogram generation component that generates a histogram representation of the discrete sensor signal values.

5. The agricultural machine of claim 3 wherein the discrete value aggregation component comprises:
   a digital titter that identifies a representative value in each group of values.

6. The agricultural machine of claim 3 wherein the control threshold generation system comprises:
   a threshold identification system that identifies the threshold value of the control threshold signal based on the aggregated discrete sensor signal values.

7. The agricultural machine of claim 6 wherein the threshold identification system comprises:
   a cumulative distribution function generator that generates a cumulative distribution function, based on the aggregated sensor signal values, that correlates a set of performance metrics to a set of threshold values.

8. The agricultural machine of claim 7 wherein the threshold identification system comprises:
   a quantile function application component that identifies the threshold value for the control threshold signal, based on a selected performance metric, using the correlation of the set of performance metrics to the set of threshold values.

9. The agricultural machine of claim 1 wherein the control threshold generation system and the control system are configured to iteratively generate the control threshold signal, with a threshold value, based on the set of sensor signal values for the given sensor signal, and generate the subsystem control signal that controls the given controllable subsystem based on the given sensor signal and based on the control threshold signal, until the threshold value changes by less than a threshold amount from one iteration to a next iteration.

10. The agricultural machine of claim 1 wherein the control threshold generation system receives the given sensor signal, obtains the set of sensor signal values indicative of values of the given sensor signal over a period of time, on a rolling basis, and automatically generates the control threshold signal, with the threshold value, based on the set of sensor signal values for the given sensor signal.

11. The agricultural machine of claim 1 wherein the agricultural machine comprises a combine and wherein the set of controllable subsystems comprise:
    a threshing subsystem;
    a front end equipment subsystem;
    a residue handling subsystem;
    a propulsion subsystem;
    a cleaning subsystem;
    a material handling subsystem; and
    a separation subsystem.

12. A method of controlling an agricultural machine, comprising:
    sensing a variable on a given one of a plurality of different controllable subsystems on the agricultural machine;
    generating a sensor signal indicative of a value of the variable;
    obtaining a set of sensor signal values indicative of values of the sensor signal over a period of time:
    identifying a frequency with which a sensor signal value in the set fall into each of a plurality of different ranges of values over the period of time;
    automatically generating a control threshold signal, with a threshold value, that is in one of the plurality of different ranges of values, based on a given metric indicative of the identified frequency; and
    generating a subsystem control signal that controls a given controllable subsystem based on the sensor signal and based on the control threshold signal, wherein automatically generating the control threshold signal comprises iteratively generating the control threshold signal until the threshold value changes by less than a threshold amount over a number of iterations.

13. The method of claim 12 wherein obtaining the set of sensor signal values comprises:
    storing the set of sensor signal values, as discrete sensor signal values, at different points in time, over the period of time.

14. The method of claim 13 wherein identifying a frequency comprises:
    aggregating the discrete sensor signal values into groups of values; and
    identifying the threshold value of the control threshold signal based on the aggregated discrete sensor signal values.

15. The method of claim 13 wherein aggregating the discrete sensor signal values comprises:

generating a histogram representation of the discrete sensor signal values.

16. The method of claim 13 wherein identifying the threshold value comprises:
    correlating a set of performance metrics to a set of threshold values based on the aggregated sensor signal values; and
    identifying the threshold value for the control threshold signal, based on a selected performance metric, using the correlation of the set of performance metrics to the set of threshold values.

17. The method of claim 12 and further comprising:
    iteratively generating the control threshold signal, with a threshold value, based on the set of sensor signal values for the given sensor signal, and generating the subsystem control signal that controls the given controllable subsystem based on the given sensor signal and based on the control threshold signal, until the threshold value stabilizes.

18. The method of claim 12 wherein the agricultural machine comprises a combine and wherein generating a subsystem control signal and controlling the set of controllable subsystems comprises controlling at least one of a threshing subsystem, a cleaning subsystem, a front end equipment subsystem, a residue handling subsystem, a propulsion subsystem, a material handling subsystem, and a separation subsystem.

19. A combine, comprising:
    a set of controllable subsystems that each perform a function on the combine;
    a plurality of sensors, each sensing a corresponding variable on a given one of the controllable subsystems, and generating a sensor signal indicative of a value of the corresponding variable;
    a control threshold generation system that receives a given sensor signal, obtains a set of sensor signal values indicative of values of the given sensor signal over a period of time, identifies a frequency with which the sensor signal values fall into each of a plurality of different ranges of values over the period of time and automatically generates a control threshold signal, with a threshold value that is in one of the plurality of different ranges of values, based on a given metric indicative of the identified frequency with which the sensor signal values fall into each of the plurality of different ranges of values; and
    a control system that generates a subsystem control signal that controls a given controllable subsystem based on the given sensor signal and based on the control threshold signal, the control threshold generation system iteratively generating the control threshold signal until the threshold value changes by less than a threshold amount over a number of iterations.

* * * * *